(12) United States Patent
Lyu et al.

(10) Patent No.: US 11,526,586 B2
(45) Date of Patent: Dec. 13, 2022

(54) COPYRIGHT DETECTION IN VIDEOS BASED ON CHANNEL CONTEXT

(71) Applicant: BroadbandTV, Corp., Vancouver (CA)

(72) Inventors: Ruishen Lyu, Vancouver (CA); Jiaqi Sheng, Vancouver (CA); Mehrdad Fatourechi, Vancouver (CA)

(73) Assignee: BroadbandTV Corp., Vancouver (CA)

( * ) Notice: Subject to any disclaimer, the term of this patent is extended or adjusted under 35 U.S.C. 154(b) by 586 days.

(21) Appl. No.: 16/593,874

(22) Filed: Oct. 4, 2019

(65) Prior Publication Data

US 2020/0110858 A1 Apr. 9, 2020

Related U.S. Application Data

(60) Provisional application No. 62/741,115, filed on Oct. 4, 2018.

(51) Int. Cl.
| | |
|---|---|
| *G06F 21/00* | (2013.01) |
| *G06F 21/10* | (2013.01) |
| *G06F 21/16* | (2013.01) |
| *G06N 20/00* | (2019.01) |
| *G06N 5/00* | (2006.01) |
| *G06N 5/04* | (2006.01) |

(52) U.S. Cl.
CPC ............ *G06F 21/16* (2013.01); *G06N 5/003* (2013.01); *G06N 5/04* (2013.01); *G06N 20/00* (2019.01); *G06F 2221/074* (2013.01)

(58) Field of Classification Search
CPC ... G06F 21/16; G06F 2221/074; G06N 20/00; G06N 5/003; G06N 5/04
See application file for complete search history.

(56) References Cited

U.S. PATENT DOCUMENTS

| | | | |
|---|---|---|---|
| 9,659,014 B1* | 5/2017 | Walters | G06F 16/7847 |
| 11,004,164 B2* | 5/2021 | Lantz | G06Q 50/184 |
| 11,025,705 B1* | 6/2021 | Brewer | G06N 5/003 |
| 11,106,944 B2* | 8/2021 | Swaminathan | G06K 9/6262 |
| 11,204,949 B1* | 12/2021 | Brewer | G06F 16/313 |
| 2019/0164062 A1* | 5/2019 | Moura | G06F 16/90344 |
| 2020/0265153 A1* | 8/2020 | Li | G06K 9/6262 |
| 2020/0342337 A1* | 10/2020 | Choudhary | G06Q 10/105 |

\* cited by examiner

*Primary Examiner* — Hosuk Song
(74) *Attorney, Agent, or Firm* — Holzer Patel Drennan (57) ABSTRACT

The herein disclosed technology provides methods and systems that utilize machine learning solutions to identify web-based channels that are sources pirated copyright material, such as by using a machine learning classifier that is trained on historical copyright piracy data and channel features that may be determined and analyzed for each of a collection of channels without analyzing video or audio content of the channel.

17 Claims, 7 Drawing Sheets

Channel Features 300

- Subscriber Count / # Videos 304
- % of channel content subject to valid use agreement 306
- Channel Metadata Keywords 314
- % of Channel Content Subject to Single Claim 308
- % of Channel Content Subject to Multiple Claims 310
- Historical Changes in Channel Viewership 322
- Channel Banner (Y/N) 316
- Channel Age 320
- Geographical Content Source 312

COPYRIGHT DETECTION IN VIDEOS BASED ON CHANNEL CONTEXT

CROSS-REFERENCE TO RELATED APPLICATIONS

The present application claims priority to U.S. Provisional patent application with Ser. No. 62/741,115 entitled "Copyright Detection in Videos Based on Channel Content," and filed on Oct. 4, 2018, which is specifically incorporated by reference for all that it discloses and teaches.

BACKGROUND

There exist a variety of different approaches to detecting video copyright misuse and copyright piracy. Some approaches rely heavily on manual policing efforts. For instance, an algorithm may be utilized to identify videos related to key search terms (e.g., movie or TV show titles) and identify videos that are then manually screened to evaluate potential copyright misusage. This solution is not scalable as it heavily relies on humans to review the content. Another approach is to insert a "watermark" in the original digital video and then attempt to detect it within the videos that are suspected for violating the copyright. This approach is also less desirable nowadays, as it needs the original content owner to have access to or leverage a $3^{rd}$ party solution to insert the watermark and then use a system to continuously download videos and detect watermarks in them.

Other copyright piracy policing systems employ video fingerprinting techniques to determine whether or not a video has a digital fingerprint matching a stored digital fingerprint for a copyrighted video. To be effective, these video fingerprint policing systems require access to an original copy of the asset (e.g., to identify and store the fingerprint initially). Compiling and maintaining such a vast database of video fingerprints is both storage and processor intensive. Moreover, video fingerprinting can be unreliable for short videos that include small clips of a copyrighted video, as the fingerprints might look very similar (e.g., for a short black screen at the end of a video).

SUMMARY

A method disclosed herein provides for determining a likelihood that a particular channel is a source of pirated copyrighted material. The method includes inputting a set of channel features to a feature-based classifier trained based on a training dataset including channel features and historical copyright piracy data for each of multiple channels; receiving from the feature-based classifier a copyright violation prediction indicating a probability that copyright-protected material is available through the channel; and executing a remedial action when the copyright violation prediction satisfies predefined criteria. According to one implementation, each one of the channel features is a channel attribute determined without analyzing video or audio content of the channel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 4 illustrates aspects of another example system for predicting whether or not a channel includes pirated copyright material.

DETAILED DESCRIPTION

The herein disclosed technology provides techniques usable to identify sources (e.g., pirates) of online pirated video content while mitigating or eliminating analysis of the actual pirated material. In some implementations, the disclosed technology identifies sources of copyright piracy without performing any analysis on the content of the video(s) pirated by those sources.

According to one implementation, a machine learning model is trained to with different combinations of channel features to identify copyrighted content uploaded to a web-based channel, such as a user-managed channel hosted by a video-sharing website. For example, an online service provider may allow users to create an individual account and to share uploaded videos through a channel associated with the user account.

In the following disclosure, the term "channel" is used to refer to a collection of digital media content items viewable from the same web domain, either in series or simultaneously. In one implementation, a digital channel refers to a user-managed URL used for sharing videos, images, text, or other content that is associated with a user account on a social media website. For example, one popular existing channel on YouTube.com with the "SaturdayNightLive" channel accessible through the URL https://www.youtube.com/user/SaturdayNightLive. This channel makes certain video content available for public viewing through the YouTube domain. In addition to YouTube.com, there exists a variety of other social media websites that allow users to create accounts and to share uploaded videos and other content through a channel associated with that account. Thus, the term "channel" may also be understood as referring to a URL associated with a user account on social media website. In still another implementation, a channel refers to a blog or Rich Site Summary (RSS) feed.

As used herein, a "channel feature" refers to a feature or attribute of a channel through which a digital video is accessed that exists and can be evaluated independent of the channel content (e.g., the digital media videos viewable through the channel). Stated differently, channel features can be determined and analyzed without performing an analysis on video or audio content hosted by the channel. A channel feature is, in some cases, stored by an online service provider in the form of metadata in association with the channel. For example, a channel feature may indicate information pertaining to the age of a channel, categorizations of content accessible through (provided by) the channel, demographic information about the channel or a user account associated with the channel, etc. These and other exemplary channel features are discussed below in detail with respect to FIG. 3.

Figure 1A:
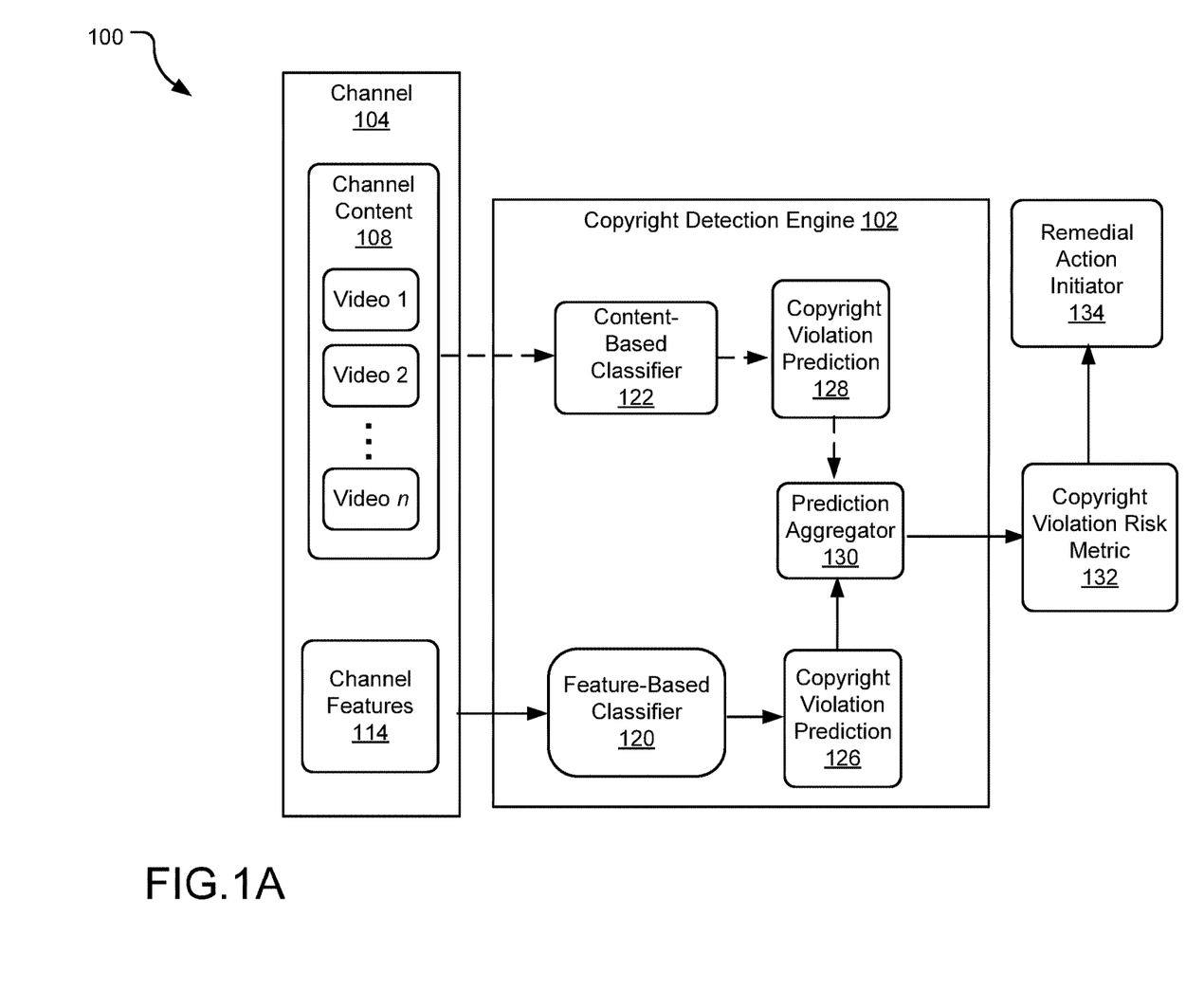
FIG. 1A illustrates an example system for predicting whether or not a channel includes pirated copyright material.

FIG. 1A illustrates an example system 100 for predicting whether or not a channel includes pirated copyright material. Pirated copyright material refers to material that is subject to common law or federal copyright protection and that has been shared through a particular channel without authorization of the copyright owner. Pirated copyright material may assume a variety of forms including without limitation images, video, and audio clips or files.

The system 100 includes a copyright detection engine 102, which may include combination of hardware and software that is either contained on a single computing device or distributed across multiple different computing devices connected together through a network. The copyright detection engine 102 evaluates channel features 114, either alone or in combination with channel content 106, to intelligently predict whether or not a particular channel 104 is likely to be a provider of copyrighted pirated material.

By example and without limitation, the channel 104 is shown to be a video channel that includes channel content 108 (e.g., Video 1, Video 2, . . . Video N) that is made accessible to one or more third party viewers through the channel 104. In addition to the channel content 108, the channel 104 is also defined by a number of channel features 114. The channel features 114 include channel data that can be retrieved, accessed, and analyzed independent of the channel content 108 and of the respective metadata of each individual content item (e.g., video) of the channel. For example, the channel features 114 may include information such as channel history information (e.g., historical changes in the number of digital content items available through the channel, frequency content additions/removals, and historical viewing statistics); network traffic statistics including the number of subscribers or followers of the channel 104 or the average number of user views of each of the relevant digital content items; and metadata of the channel itself, such as metadata describing the nature of the channel (e.g., channel name or description including category, topic id, content type), a recorded number of user engagement signals (e.g., the number of 'likes', 'dislikes', "favorites", 'comments' or 'shares' associated with the channel 104 or various digital content items of the channel), or demographics of users subscribed to the channel. As used herein, a user is said to be "subscribed" to a channel when the user has a social media account with a setting that is configured to selectively receive content from the channel while not receiving content from one or more other channels hosted on the same digital video (also referred herein as a channel provider or a source domain).

In one implementation, some or all of the channel features 114 are within or derivable from "channel metadata," which is used herein to refer to data that is descriptive of a channel as a whole or stored in association with the channel, such as by a digital video platform that hosts the channel (e.g., YouTube stores channel metadata in association with each user-hosted channel).

The copyright detection engine 102 is shown to include two classifiers—a feature-based classifier 120 and a content-based classifier 122. In some implementations, the copyright detection engine 102 includes only a feature-based classifier 120. Outputs of these two classifiers are used either in isolation or in combination to render a copyright violation risk metric 124. Although the copyright violation risk metric 124 may assume a variety of forms in different implementations, the copyright violation risk metric 124 is, in one implementation of the disclosed technology, a numerical indicator of a probability that the channel 104 includes one or more content items (e.g., videos) that include some pirated copyrighted material. In another implementation, the output might be a label that indicates the level of risk associated with a channel (e.g., low, medium, and high).

In one implementation, the feature-based classifier 120 is a machine learning model that has been trained based on a training set of channel features for various channels (e.g., channel features the same or similar in type to the channel features 114 of the channel 104) to render a first copyright violation prediction 126. In different implementations, the feature-based classifier 120 is implemented using different types of machine learning solutions. In one implementation, the features-based classifier is trained using supervised machine learning solutions to associate different patterns and distributions of channel features 114 with affirmative and negative instances of copyright violations. For example, the feature-based classifier 120 may be trained with a training data set (not shown) that includes the channel features 114 specific to thousands of different channels in addition to a pre-defined copyright violation flag (e.g., a Y/N binary indication of whether or not the channel content 108 of the channel is known (in advance) to include pirated copyright material.) Although a variety of supervised learning solutions may be suitable for implementing the feature-based classifier 120, one implementation of the copyright detection engine 102 utilizes a random forest model.

Some implementations of the copyright detection engine 102 implement reinforcement learning during ongoing in-field use of the feature-based classifier 120 and/or the content-based classifier 122 in order to improve the capability of copyright detection engine 102 to accurately forecast the likelihood of copyright piracy.

In operation, the feature-based classifier 120 receives the channel features 114 for a test channel (e.g., the channel 104) and renders the first copyright violation prediction 126 based on an analysis of one or more of the channel features 114 in view of the training data set. The first copyright violation prediction 126 is indicative of whether or not the associated content of the channel (e.g., channel content 108) includes any copyright-protected material. In one implementation, the first copyright violation prediction 126 includes a binary prediction (e.g., Y/N) indicating whether or not the channel features 114 are indicative of a potential copyright violation within the channel content 108. In another implementation, the output of the first copyright violation prediction 126 might include a label-based prediction (e.g., low, medium, and high). In yet another implementation, the first copyright violation prediction 126 is a probabilistic numerical prediction indicating a likelihood, based on an analysis of the channel features 114, of a potential copyright violation within the channel content 108. Notably, the feature-based classifier 120 does not perform any analysis on the channel content 108. Consequently, the first copyright violation prediction 126 is derived independent of the channel content 108 and independent of any analysis on the channel content 108.

Some, but not all, implementations of the disclosed technology also include the content-based classifier 122. The content-based classifier 112 receives the channel content 108 and performs an analysis on that channel content 108 (e.g., an analysis on all or subset of the channel's videos, images, and/or audio) to assess whether the channel content 108 is indicative of a potential copyright violation. Based on the analysis of channel content 108, the content-based classifier 122 outputs a second copyright violation prediction 128. Like the first copyright violation prediction 126, the second copyright violation prediction 128 may be in the form of a binary prediction (e.g., a Y/N indicating whether the analysis resulted in identification of copyright-protected material) or a label-based prediction (e.g., low, medium and high), or a probability (e.g., a probabilistic numerical prediction indicating a likelihood, based on an analysis of the channel content 108, of a potential copyright violation within the channel content 108). In another implementation, the second copyright violation prediction 128 is an array defined by a collection of different predictions, such as a first prediction based on audio analysis, a second prediction based on video analysis, a third prediction based on textual analysis (e.g., of text in the video or in metadata associated with the video), etc. In still other implementations, one or both of the first copyright violation prediction 126 and the second copyright violation prediction 128 assume different forms other than those described above (e.g., a "yes/no/maybe" or some other representation of the associated classifier's prediction).

Notably, analysis of channel content 108 can be processing intensive and therefore expensive, particularly when large portions of video are parsed for using fingerprint analysis techniques (also sometimes referred to as watermark analysis) to determine whether a particular video matches a copyrighted video stored in a repository. For this reason, it may not be feasible to perform an analysis on all of the videos of the channel 104, or even upon a selection of complete individual videos included within the channel content 108. The techniques described herein are, in one implementation, applied selectively to subsets of the channel content to mitigate total processing analysis. Moreover, in one implementation, the copyright detection engine 102 does not employ the content-based classifier 122 to analyze channel content 108 of the channel 104 unless the prediction rendered by the feature-based classifier 120 (e.g., the first copyright violation prediction 126) satisfies a condition indicative of a potential copyright violation, such as when the first copyright violation prediction 126 is a numerical value indicating a probability that satisfies a set condition.

For example, the copyright detection engine 102 may selectively employ the content-based classifier 122 to analyze the channel content 108 if it is first determined, from the analysis of the channel features 114, that the channel has a medium likelihood (e.g., 50-75%) of including copyright-protected material. In this example, the content-based classifier 122 is employed to perform a secondary and subsequent check on the channel 104 when there is a medium (but not high) confidence that the channel 104 includes copyright-protected material based on the first copyright violation prediction 126. The content-based classifier 122 does not perform any analysis on the channel content 108 when the first copyright violation prediction 126 indicates a low probability of copyright-protected material (e.g., less than some threshold such as 50%) or when the first copyright violation prediction 126 indicates an especially strong probability of copyright-protected material (e.g., greater than some threshold such as 75%).

In yet another implementation, the content-based classifier 122 is employed to perform a secondary and subsequent check on the channel 104 whenever the first copyright violation prediction 126 indicates a medium or high likelihood that the channel includes copyright-protected material, such as when the first copyright violation prediction 126 represents a probability of copyright piracy in excess of a defined threshold (e.g., anytime there is greater than a 60% probability).

In another implementation, the content-based classifier 122 performs at least some analysis on the channel content 108 regardless of the value of the first copyright violation prediction 126 rendered by the feature-based classifier 120. In still yet another implementation, the copyright detection engine 102 does not include the content-based classifier 122 at all.

In implementations that utilize the combination of the feature-based classifier 120 and the content-based classifier 122 in some capacity, a prediction aggregator 130 may be included to aggregate the first copyright violation prediction 126 and the second copyright violation prediction 128 to derive an overall copyright violation risk metric 132. The copyright violation risk metric 132 may be derived in a number of ways including selective weighting of the first copyright violation prediction 126 and the second copyright violation prediction 128 or their associated respective parameters, averaging of such values, or any other suitable methodology.

In addition to the features discussed above, the system 100 may further include a remedial action initiator 134 that takes some automated remedial action in instances where the copyright violation risk metric 132 satisfies a defined condition, such as by exceeding a predetermined threshold. Exemplary remedial actions may, for example, include logging a channel identifier as potentially problematic, notifying an online service provider (e.g., a domain owner such as YouTube) that the channel 104 has been identified as such or, in some cases, automatically disabling the channel or removing videos accessible through the channel 104.

Figure 1B:
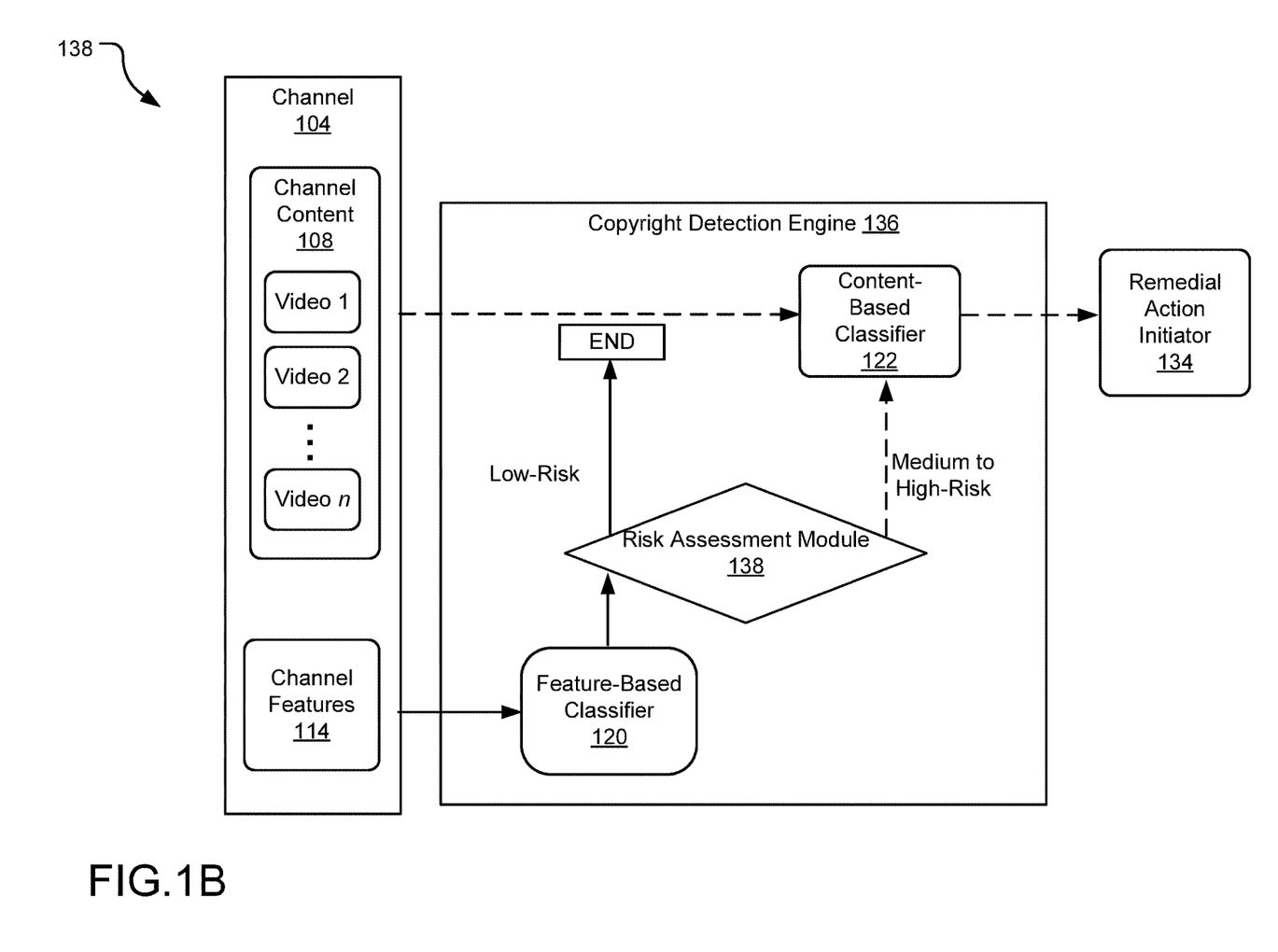
FIG. 1B illustrates another example system for predicting whether or not a channel includes pirated copyright material.

FIG. 1B illustrates another example system 138 for predicting whether or not a channel includes pirated copyright material. The system 138 includes many of the same exemplary components described above with respect to FIG. 1 including a copyright detecting engine 136 that includes the feature-based classifier 120 and the content-based classifier 122 of FIG. 1A. In contrast to the system of FIG. 1A, FIG. 1B illustrates the feature-based classifier 120 and the content-based classifier 122 in series rather than parallel. The feature-based classifier 120 evaluates the channel features 114 in a manner the same or similar to that described above. Outputs of the feature-based classifier 120 are evaluated by a risk assessment module 138, which generally evaluates whether or not the received outputs satisfy set criteria indicative of a certain level of risk. Provided the outputs of the feature-based classifier 120 indicate a low risk of pirated copyright material within the channel 104, no further analysis is performed on the channel.

If, however, the outputs of the feature-based classifier 120 indicate a level of risk that satisfies predefined risk criteria (e.g., criteria associated with medium and/or high risk, depending on the implementation), the risk assessment module 128 instructs the content-based classifier 122 to perform a content-based analysis on the channel content 108 and the content-based classifier 122 performs an analysis the same or similar to that described above with respect to FIG. 1A.

Pirated copyright material refers to material that is subject to common law or federal copyright protection and that has been shared through a particular channel without authorization of the copyright owner. Pirated copyright material may assume a variety of forms including without limitation images, video, and audio clips or files.

The system 100 includes a copyright detection engine 102, which may include combination of hardware and software that is either contained on a single computing device or distributed across multiple different computing devices connected together through a network. The copyright detection engine 102 evaluates channel features 114, either alone or in combination with channel content 106, to intelligently predict whether or not a particular channel 104 is likely to be a provider of copyrighted pirated material. When outputs of the content-based classifier 122 satisfy predefined criteria, the remedial action initiator 134 may perform a remedial action as described above with respect to FIG. 1A.

Figure 2:
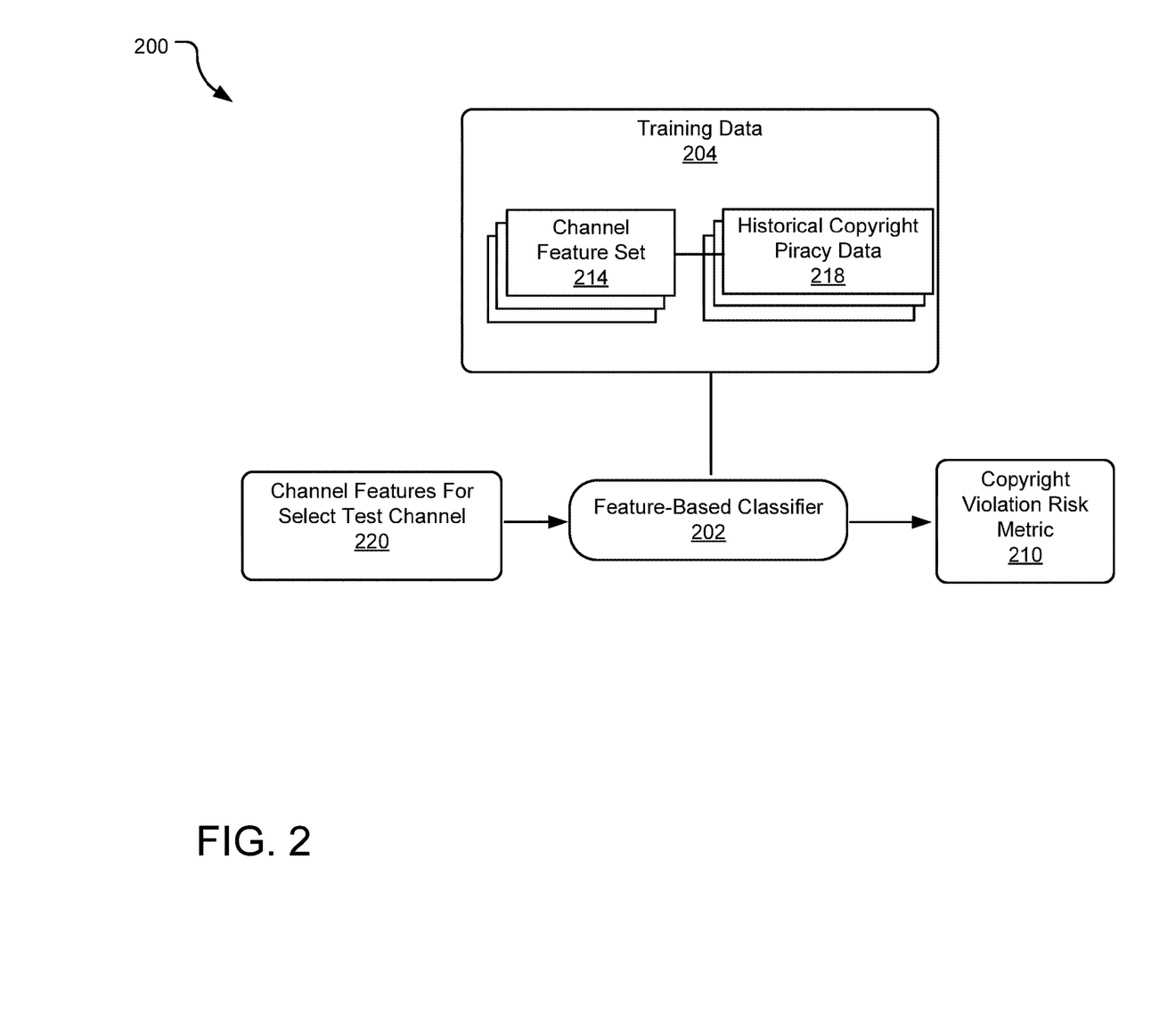
FIG. 2 illustrates aspects another example system for predicting whether or not a channel includes pirated copyright material.

FIG. 2 illustrates aspects another example system 200 for predicting whether or not a channel includes pirated copyright material. The system 200 includes a feature-based classifier 202 that is a machine learning model trained on a training data set 204 that includes a channel feature set 214 (e.g., a set of channel features for each of multiple different channels). Training data set 204 also includes a historical copyright piracy data 218 in association with each different channel and each corresponding channel feature set. In one implementation, the historical copyright piracy data 218 includes a copyright violation flag (e.g., a Y/N binary flag) indicating whether the corresponding channel has been pre-identified as being a source of pirated copyright material. In one implementation, the training data set 204 includes data pertaining to channels hosted by the same digital video platform and associated with different user accounts of the digital video platform.

The exact set of the channel features 214 utilized to train the feature-based classifier 202 may vary from one implementation to another; however, the channel features 214 may, for example, include some or all of the channel features 114 generally described with respect to FIG. 1. Each of the channel features can be determined and analyzed for a given channel without performing an analysis on video or audio content available through the channel. A more extensive subset of exemplary channel features is discussed below with reference to FIG. 3.

Once trained, the feature-based classifier 202 may be provided with the channel feature values for a select test channel 220 corresponding to the same channel features set 214 utilized to train the feature-based classifier 202. The feature-based classifier 202 renders a copyright violation risk metric (e.g., a probability that the test channel includes pirated content). Other aspects of the feature-based classifier 202 and copyright violation risk metric 210 not explicitly described with respect to FIG. 2 may be the same or similar to those described with respect to like-named elements other implementations of the disclosed technology.

Figure 3:
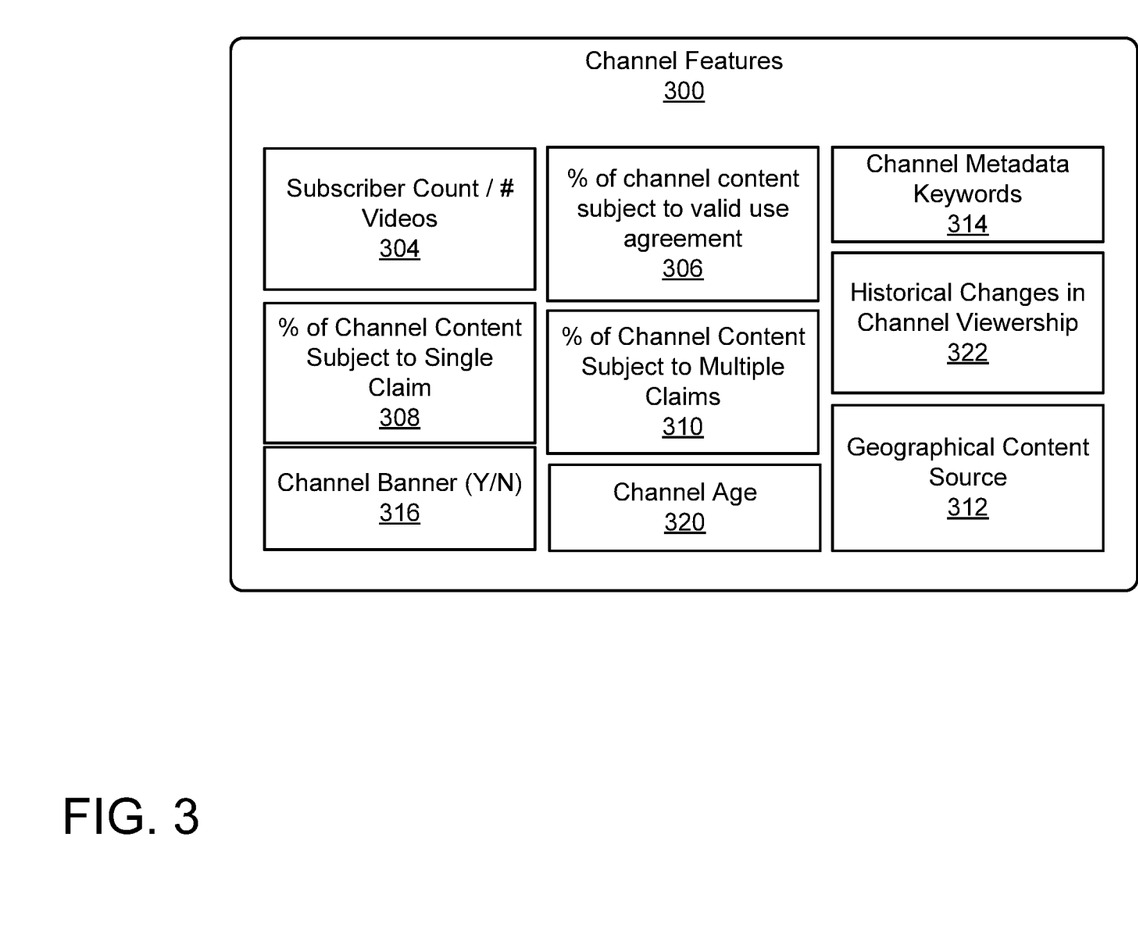
FIG. 3 illustrates a variety of example channel features that may be included in a set of channel features used to train a feature-based classifier.

FIG. 3 illustrates a variety of example channel features 300 that may be included in a set of channel features used to train a feature-based classifier (e.g., the feature-based classifier 202 in FIG. 2 or feature-based classifier 120 in FIG. 1). In various implementations, a training dataset for a feature-based classifier may include any combination of the channel features 300 as well as various features in addition to or in lieu of some of the channel features shown. In different implementations, the channel features 300 may be determined for a given channel in a variety of different ways.

In one implementation, the digital video platform of the channel provides a API that allows a developer to extract one or more of the channel features 300 from metadata that is associated with each channel on the digital video platform's server.

Each of the exemplary channel features is discussed in detail below.

The first one of the illustrated channel features 300 is a ratio 304 of a channel's subscriber count to the number of videos available through the channel. Observations of this metric have shown a positive correlation between the size of the ratio 304 and the likelihood of copyright piracy within content of a given channel. When, for example, this ratio is large and the channel has a large number of subscribers or followers and a small number of videos (e.g., ten million subscribers and ten videos), this may indicate that the channel has been forced to comply with repeated take-down orders (e.g., orders resulting in automated or manual removal of channel content) as the result of multiple past complaints of copyright infringement raised by copyright owners. In another implementation, a different formula might be used to capture the relationship between a channel's subscriber count and the number of videos available through the channel (e.g., use the ratio of the number of videos available through the channel to the channel's subscriber count).

Another one of the channel features 300 is a percentage of channel content known to be subject to valid use agreement 306. Some digital video platforms allow users to explicitly authorize unrestricted use of their video content, and this authorization effectively marks the content and/or the content metadata in an identifiable way. For example, YouTube offers a feature that allows users to mark their original content as "creative commons" content, thereby granting all YouTube users the right to reuse and edit the content. Notably, YouTube also implements a security feature that utilizes video fingerprinting to ensure that users do mark content as "creative commons" if that content is cataloged in a database in association with an explicit claim to the content. Other digital video platforms may similarly implement mechanisms for marking content that is known to be not pirated. The percentage of channel content that is known to be not pirated (e.g., subject to valid use agreement) can therefore be indicative of the copyright violation risk posed by a particular channel.

Other channel features 300 that may be used to train a feature-based channel classifier pertain to specific, known copyright claims to content, such as claims that are indicated in metadata of each video. For example, a digital video platform may allow a content provider (e.g., channel host) to place a "copyright claim" on individual videos that the user believes to be self-created original content. In such cases, the digital video platform may maintain a database of all content that includes one or more such claims and mark each video (or video metadata) in a way that indicates the number of copyright claims associated with the video. In some cases, these copyright claims may be placed manually (as described above); in other cases, digital watermarking or digital fingerprinting techniques may be utilized to determine whether the video is subject to a copyright claim (e.g., the video is indexed in a database in association with a copyright claim).

If a video is subject to a single copyright claim, this is usually a strong indication that the video does not include pirated copyright material (as the content uploader by default is considered to have the copyright of the content uploaded and therefore places a single copyright claim on the video). For this reason, the percentage of channel content subject to a single claim 308 within a particular channel may be one channel features utilized to train a feature-based classifier.

If a video is the subject of multiple copyright claims, this may sometimes—but not always—be indicative of a copyright violation. In some instances, a user may create and upload original content that utilizes third-party-owned copyrighted content, such as a song or video clip. In these cases, a video may be subject to multiple claims in the both the situation where the user has secured a valid license to the third-party-owned copyright and also in the situation where the user has not secured a valid license to the third-party-owned copyrighted content. Thus, the percentage of channel content that is subject to multiple claims is not a dispositive indicator of pirated copyright material, but this channel feature can sometimes indicate an increased potential for pirated content. For this reason, a channel's percentage of content subject to multiple claims 310 may also be used to training a feature-based classifier.

Geographical content source 312 represents yet another channel feature that may be utilized to train a channel-based classifier. A digital video platform user-provided content may include the geographical source of a certain video within the video's metadata or within metadata associated with the user that uploaded the video. Because copyright infringement is more prevalent in certain regions of the world, the geographical content source 312 can occasionally serve to indicate an increased risk of copyright violation.

Channel metadata keywords 314 such as channel name or user-provided description may also be indicative of the relative copyright violation risk presented by a particular channel. For example, certain keywords such as "trailer", "full movie", "episode", "season", "Vine", "film", "documentary", "Snapchat", "compilation", as "Official Music Video", "TV Program", etc. may be indicative of a copyright violation. For this reason, some implementations of the feature-based channel classifier may be trained based on a training dataset that is indicative of the percentage of channel content associated with keywords preidentified as problematic (such as those exemplary words listed above). For example, the channel metadata keywords 314 may indicate a percentage of the total content on the channel that is associated with words on a pre-created list and/or specifically identify those terms. For example, a video may be recognized as "associated with" words on such a list of the video has textual metadata (e.g., a title, description, keywords, category) including one or more such words.

Inclusion of a channel banner 316 is another one of the channel features 300 that may be indicative of a relative risk of copyright violation for a given channel. Some digital video platform hosts allow users to create a channel banner, such as a logo or other artistic expression, to be presented on top of channel content. When channel banner creation is available, the non-existence of a channel banner may in some cases be indicative of an increased risk of copyright violation. For example, the non-existence of a channel banner may generally indicate that the user did not spend as much time personalizing the channel. In some datasets, the lack of such a banner positively correlates with an increased risk of copyright infringement.

In some implementations, a numerical "topic risk metric 318" may be computed for a channel and included in a training dataset for a feature-based channel classifier. The topic risk metric 318 refers to a metric that quantifies a risk associated with known topics or labels of the content items available on the channel. For example, certain popular shows or movies (e.g., "Game of Thrones") may be generally at higher risk of being pirated and shared without copyright owner permission through online channels. According to one implementation, a predefined topic list assigns a numerical metric to each of several pre-identified "potentially-risky topics." For example, the topic "cooking" may be associated with a 1/10 risk of copyright piracy while the topic "Bob the Builder" is associated with a 4/10, and the topic "Game of Thrones" is associated with a 10/10 risk.

In one implementation, determining the topic risk metric 318 includes parsing metadata associated with each content item on a given channel to identify topics from the predefined list that also appear in video descriptions, titles, keywords, and topic field identifiers (if available). As topics are identified for the different content items on each channel, the topic risk metric 318 is computed for the channel. For example, the topic risk metric 318 may be based on an average of topic scores for content on the channel. In this case, if Channel A is identified as having content associated with five topics and the associated risk scores 0.8, 0.7, 0.6, 0.5, 0.2, then the topic risk metric 318 may be an average of these values. In another implementation, a threshold filter is applied such that topics with lower risk scores do not affect the channel's overall topic risk metric. In still other implementations, the topic scores for each different content item are summed rather than averaged to arrive and the topic risk metric 318 for the channel. In yet another implementation, the topic associated with the highest risk is selected as the representative topic of the video and its associated risk score is considered to be the risk score of that channel.

In still other implementations, channel age 320 is a channel feature 300 included in the training dataset for the feature-based classifier. The channel age 320 may, for example, be given by time period between the present data and the initial publication of the channel (e.g., the data a user first created the channel or uploaded content to the channel stream). In some cases, older and more established channels are less likely to include pirated copyright material than newer channels. For this reason, channel age can be indicative of a likelihood that the channel includes pirated content.

In yet still other implementations, historical changes in channel viewership 322 may be indicative of copyright violation risk and therefore included in the training dataset for the feature-based channel classifier. For example, a digital video platform (e.g., YouTube) may track and store metadata associated with individual channels and/or videos indicating video watch time over some time interval, such as the current year or the previous year. A sharp decrease in channel viewership may, in some cases, correlate with a higher likelihood of a copyright violation. For example, viewership may change as a result of a decrease in content available on the channel, such as a decrease in content that occurs when the digital video platform responds to a takedown request based on copyright infringement when the digital video platform performs automated scanning that flags and removes content identified as pirated. In one implementation, the historical changes in channel viewership 322 channel feature is a Boolean expression set to a first value when there has been a decrease in channel viewership over a predefined interval (e.g., 1 year) and otherwise set to a second value.

Once a feature-based channel classifier is trained using some or all of the above-described features in association with each of multiple different channels (e.g., as described above with respect to FIG. 2) and predefined (known) copyright infringement determinations for each channel, the classifier may receive a set of channel features for a particular channel and render a copyright violation prediction for that channel, such as in the manner consistent with other descriptions herein. Notably, some instances of the feature-based classifier may be trained on other features in addition to or in lieu of those shown in FIG. 3.

FIG. 4 illustrates aspects of another example system 400 for predicting whether or not a channel includes pirated copyright material. Specifically, the system 400 includes a content-based classifier 402 that evaluates channel content 408. The content-based classifier 402 may, for example, perform functions the same or similar to those described with respect to the content-based classifier 122 of FIG. 1. The content-based classifier 402 receives the channel content 408 for a particular channel and parses the content down into three different groups of content that are, in turn, subjected to different types of analysis. A first content group including thumbnails and selected images 404 is input into a logo recognition engine 414, and the logo recognition engine 414 analyzes the thumbnails and images to determine whether a copyrighted logo, such as a TV station logo (e.g., CNN, FOX, etc.), appears in the images.

In one implementation, the logo recognition engine 414 employs logic to identify a graphic in a corner or edge region of the screen that remains unchanged over several video frames during which time the remaining portions of the scene change. Once the logo is identified in this manner, image recognition software may be used to analyze the graphic and determine if it is a recognized logo, such as a logo for a TV station. The classification of a graphic as a logo indicates an increased likelihood of copyright infringement. Utilizing changed/unchanged portions of the video frames to identify logos in this manner allows for a significant reduction in the amount of time and processing power utilized in logo identification as opposed to existing techniques that primarily rely on image recognition alone. In other implementations, the logo recognition engine 414 might leverage other digital signal processing and machine learning algorithms such as "feature points" to detect and recognize logos.

The logo recognition engine 414 outputs a copyright violation prediction 420 indicating a likelihood of logo copyright infringement in one or more videos of the channel content 408. Like other copyright violation predictions described herein, the copyright violation prediction 420 may assume different forms including probabilistic (e.g., percent likelihood), binary (Y/N), labels (low, medium and high), otherwise numerical, etc.

During the analysis illustrated within FIG. 4, a second content group including textual aspects of the channel content 408 (e.g., text extracted from the videos of the channel and/or metadata of the videos) is input to a text analysis engine 416. In FIG. 4, the text analysis engine 416 is shown receiving titles, tags and descriptions 410 for one or more of the videos of the channel. In one implementation, the text analysis engine 416 searches the title, tags, and description to identify words matching or otherwise corresponding to words included in a preidentified list as being likely to show up in pirated content. For example, words indicative of potential copyright infringement include without limitation: trailer, full movie, clips, episode, season, vine, film, documentary, Snapchat, Film, Documentary, Compilation, Official Music Video, TV program, Full Episode, etc. Based on the above-described textual analysis, the text analysis engine 416 renders another copyright violation prediction 422 that generally represents whether or not the textual content of the channel is indicative of a probable copyright violation.

In one implementation, the copyright violation prediction 422 indicates percentage of channel content that is identified as being associated with words on a predefined "high copyright risk" list (e.g., a list as described above). In another implementation, the copyright violation prediction 422 includes a binary indication of whether or not any videos of the select channel are associated with words on the predefined list. Like other copyright violation predictions described herein, the copyright violation prediction 422 may assume different forms including probabilistic (e.g., percent likelihood), labels (low, medium or high), binary (Y/N), etc.

In addition to the analysis performed by the logo recognition engine 414 and the text analysis engine 415, the content-based classifier may also include an audio/video fingerprinting engine 418 that receives audio and video clips and that performs audio/video fingerprinting on all or a fraction of the audio and video clips received. Audio/video fingerprinting generally refers to a processing "matching" analysis to determine whether an audio or video clip includes content identical to some portion of a copyrighted audio or video clip that has been indexed and stored in a database. Audio and video fingerprinting can be processing intensive if performed extensively (e.g., on all channels or all videos of a particular channel). For this reason, the audio/video fingerprinting engine 418 is, in some instances, not utilized unless the copyright violation predictions output by one or more other system engines (e.g., the logo recognition engine 414, the text analysis engine 416, or the feature-based classifier 202 of FIG. 2) collectively or individually satisfy some predefined criteria. For example, the audio/video fingerprinting engine 418 may, in some cases, analyze only videos that have already been identified by the logo recognition engine 414 and/or text analysis engine 416 as having a probability of including pirated copyright material that exceeds some threshold or that satisfies other predefined criteria.

The audio/video fingerprinting engine 418 outputs yet another copyright violation prediction 424 that is indicative of the output of the audio/video fingerprint analysis. For example, this prediction may indicate number of videos or percentage of analyzed videos identified as including copyrighted content for a channel.

The content-based classifier 402 provides the copyright violation predictions 420, 422, and 424 output by each of its respective analysis engines to a prediction aggregator 426 (e.g., the prediction aggregator 130 illustrated in FIG. 1), which in turn outputs a representation of the copyright piracy risk based on the analysis performed by the content-based classifier 422 (either alone, or further based on the analysis of a feature-based classifier, as described with respect to FIG. 1-3).

The Prediction Aggregator 426 analyzes the outputs of copyright detection modules 420, 422 and 424 and generates a final score regarding the copyright risk of the channel. As an example, in one implementation, if all three modules have a binary (Y/N) output, Prediction Aggregator 426 may leverage the label with the highest frequency as the final score. As an example, if the three modules produce labels Y, N, Y respectively, then "Y" will be the output of the Prediction Aggregator 426. In another implementation, where all three modules generate a score between 0 and 1, the Prediction Aggregator 426 might leverage sum of the individual scores (to the maximum of 1) or the maximum of each score or the average of all three scores as the final risk factor.

Figure 5:
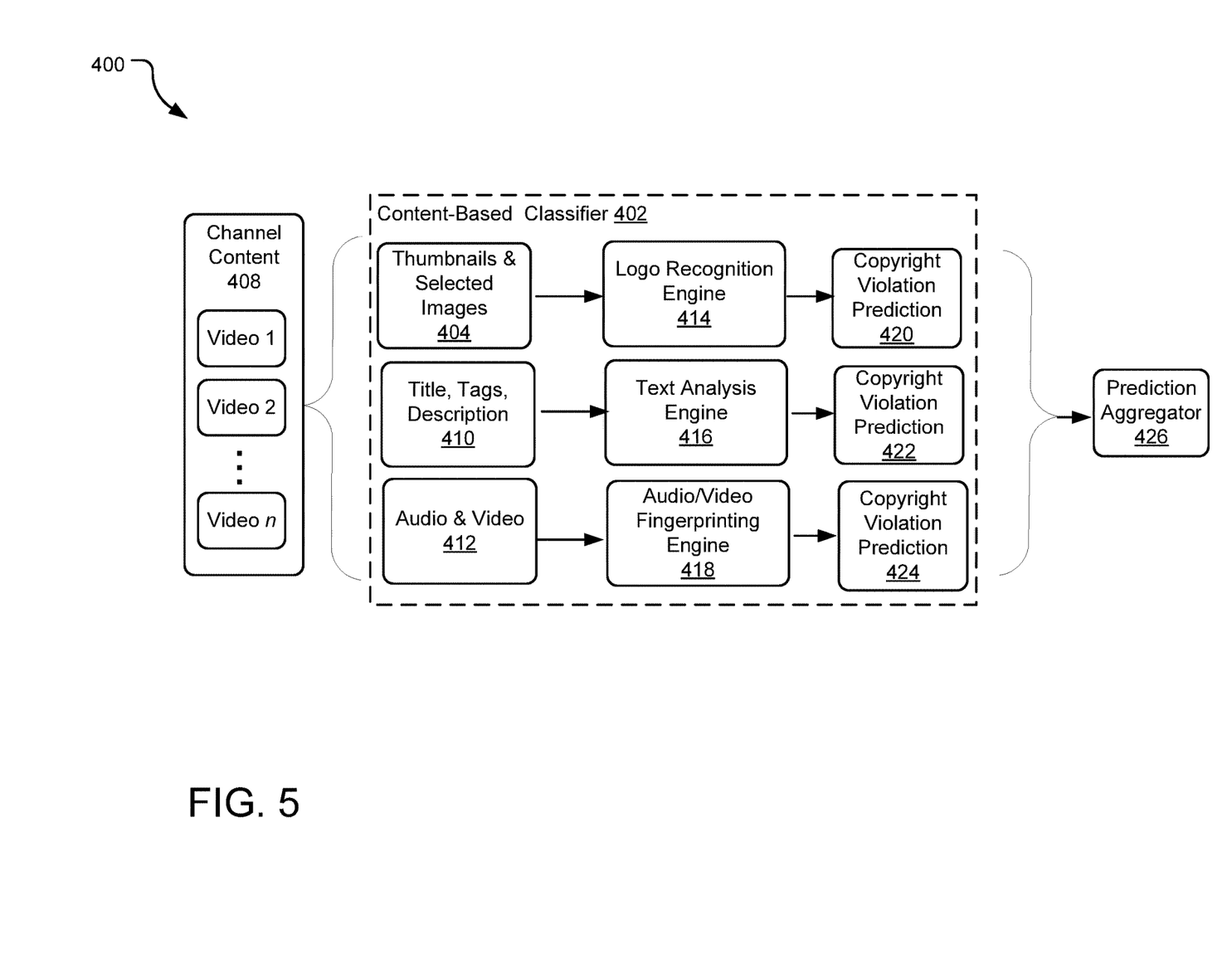
FIG. 5 illustrates example operations for detecting pirated copyright material based on channel features that can be determined independent of channel content.

FIG. 5 illustrates example operations for detecting pirated copyright material based on channel features that can be determined independent of channel content. A providing operation 503 provides a set of channel features for an identified channel to a feature-based classifier that is trained based on sets of historical channel features for different channels and known associations between those sets of historical channel features and instances of copyright infringement. The channel-based classifier performs its analysis of the channel features without analyzing channel content (e.g., without analyzing any videos, audio, or images available through the channel), such as in the manner described herein with respect to FIG. 1-3.

A receiving operation 504 receives a first copyright violation prediction that is rendered according to the above-described analysis and output from the feature-based classifier. A determination operation 506 determines whether the first copyright violation prediction satisfies predefined criteria that trigger additional analysis of the channel or its content. In one implementation, the predefined criteria area satisfied when the copyright violation prediction indicates a medium likelihood that the channel includes pirated copyright material (e.g., the "medium likelihood" being satisfied by a probability that exceeds a threshold set for "low likelihood" but that does not meet the threshold set for "high likelihood). For example, the determination operation 506 may determine that addition review of the channel is warranted when the first copyright violation prediction indicates a probability of copyright infringement that is between 40 and 70 percent. In another implementation, the determination operation 506 determines that the first copyright prediction satisfies the predefined criteria when it indicates a probability of copyright infringement that exceeds some threshold, such as 80%.

If the determination operation 506 determines that the first copyright violation prediction does not satisfy the predefined criteria triggering further channel analysis, no additional analysis is performed for the channel. Another determination operation 512 determines whether the first copyright violation prediction satisfies criteria defined by a rule that provides for execution of a remedial action when the criteria are satisfied. For example, one remedial action rule may provide for transmission of a notification flagging the channel for additional review or content take-down proceedings when the first copyright violation prediction indicates that the probability of copyright infringement for the channel is 80% or greater. Another remedial action rule may provide for logging of channel information when the first copyright prediction satisfies the set criteria.

If the determination operation 506 determines that the first copyright violation prediction does not satisfy the predefined criteria triggering further channel analysis, a provisioning operation 508 provides content of the channel (e.g., videos, images, audio, and content-specific metadata) to a content-based classifier that performs content-based classification the same or similar to that described above with respect to FIGS. 1 and 4. This classification is based specifically on channel content. A receiving operation 510 receives a second copyright violation prediction. This prediction is rendered and output from the content-based classifier. The determination operation 512 then determines whether either or both of the first copyright violation prediction and the second copyright violation prediction satisfy criteria defined by one or more rules providing for execution of a remedial action when the criteria are satisfied. For example, one rule may provide for revocation of content-sharing positions for a content creator (e.g., owner) of the channel when the second copyright prediction indicates a likelihood of copyright infringement in excess of some threshold (e.g., 75%).

Another example rule may provide for flagging of the channel for additional manual review when the second copyright violation prediction is inconclusive (e.g., indicating 50-75% probability).

Figure 6:
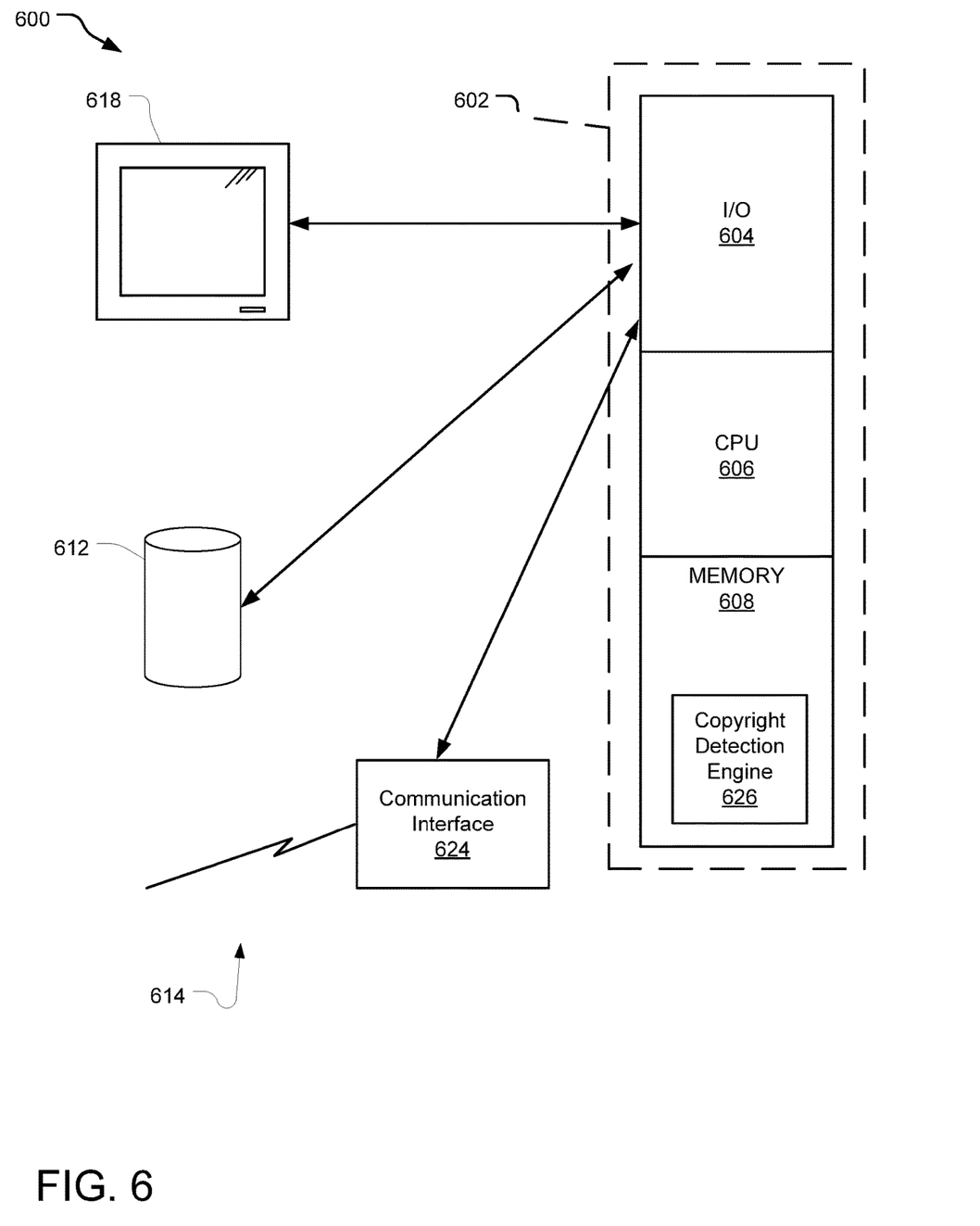
FIG. 6 illustrates a block diagram of a computer system suitable for implementing one or more aspects of a system for detecting copyrighted content within a video-based channel.

FIG. 6 illustrates a block diagram of a computer system 600 suitable for implementing one or more aspects of a system for detecting copyrighted content within a video-based channel. The computer system 600 is capable of executing a computer program product embodied in a tangible computer-readable storage medium to execute a computer process. Data and program files may be input to the computer system 600, which reads the files and executes the programs therein using one or more processors. Some of the elements of a computer system 600 are shown in FIG. 6 wherein a processor 602 is shown having an input/output (I/O) section 604, a Central Processing Unit (CPU) 606, a Graphics Processing Unit (GPU) and a memory section 608. There may be one or more processors 602, such that the processor 602 of the computing system 600 comprises a single central-processing unit 606, or a plurality of processing units. The processors may be single core, dual-core or multi-core processors. The computing system 600 may be a conventional computer, a distributed computer, a computer or group of computers as a part of a cloud computing service or any other type of computer. The described technology is optionally implemented in software loaded in memory 608, a storage unit 612, and/or communicated via a wired or wireless network link 614 on a carrier signal (e.g., Ethernet, 3G wireless, 4G wireless, LTE (Long Term Evolution), 5G wireless) thereby transforming the computing system 600 in FIG. 6 to a special purpose machine for implementing the described operations.

The I/O section 604 may be connected to one or more user-interface devices (e.g., a keyboard, a touch-screen display unit 618, etc.) or a storage unit 612. Computer program products containing mechanisms to effectuate the systems and methods in accordance with the described technology may reside in the memory section 608 or on the storage unit 612 of such a computer system 600.

A communication interface 624 is capable of connecting the computer system 600 to a network via the network link 614, through which the computer system can receive instructions and data embodied in a carrier wave. When used in local area networking (LAN) environment, the computer system 600 is connected (by wired connection or wirelessly) to a local network through the communication interface 624, which is one type of communications device. When used in a wide-area-networking (WAN) environment, the computer system 600 typically includes a modem, a network adapter, or any other type of communications device for establishing communications over the wide area network. In a networked environment, program modules depicted relative to the computer system 1000 or portions thereof, may be stored in a remote memory storage device. It is appreciated that the network connections shown are examples of communications devices for and other means of establishing a communications link between the computers may be used.

In an example implementation, a copyright detection engine 626 (e.g., 102 of FIG. 1) includes one or more of a feature-based classifiers (e.g., 120 of FIG. 1) and a content-based classifier (e.g., 122 of FIG. 1). The copyright detection engine is embodied by instructions stored in memory 608 and/or the storage unit 612 and executed by the processor 602.

One or more relational or non-relational databases storing digital content metadata and/or digital content items searchable by the relevant digital content identifier may be stored in the disc storage unit 612 or other storage locations accessible by the computer system 600, such as across a wide area network (WAN) or a local area network (LAN) or a private cloud. In addition, the computer system 600 may utilize a variety of tools to mine and process digital media content and related metadata such as one or more knowledge base systems accessible across a network and/or various database query tools, such as tools provided one or more digital media sharing websites. A sentiment prediction engine and/or any of its associated submodules (e.g., text analyzer, image recognition and classification module) may be implemented using a general-purpose computer and specialized software (such as a server executing service software), a special purpose computing system and specialized software (such as a mobile device or network appliance executing service software), or other computing configurations. In addition, modules of a market influence analysis engine may be stored in the memory 608 and/or the storage unit 612 and executed by the processor 602.

The implementations of the invention described herein are implemented as logical steps in one or more computer systems. The logical operations of the present invention are implemented (1) as a sequence of processor-implemented steps executing in one or more computer systems and (2) as interconnected machines or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method of identifying a channel as being a source of pirated copyrighted material, the method comprising:
   inputting a set of channel features to a feature-based classifier trained based on a training dataset including channel features and historical copyright piracy data for each of multiple channels, the historical copyright piracy data included in the training dataset including a binary indicator for each of the multiple channels that indicates whether the associated channel is preidentified as a source of pirated copyright material, each one of the channel features being a channel attribute determined without analyzing video or audio content of the channel;
   receiving an output from the feature-based classifier, the output including a first copyright violation prediction indicating a probability that copyright-protected material is available through the channel; and
   executing a remedial action when the first copyright violation prediction satisfies predefined criteria.

2. The method of claim 1, wherein the channel features include one or more features from a group comprising:
   a ratio between a number of subscribers to the channel and a number of active videos available on the channel;
   a geographical source associated with the channel;
   an age of the channel;
   channel banner;
   historical changes in channel viewership; and
   metadata indicating ownership claims to content of the channel.

3. The method of claim 1, wherein the channel features include channel metadata including at least one of a channel description and a title.

4. The method of claim 1, further comprising:
   determining that the copyright violation prediction output by the feature-based classifier exceeds a first predefined threshold but does not exceed a second predefined threshold;
   analyzing video content of the channel responsive to the determination, the video content including at least one of image data and audio data;
   rendering a second copyright violation prediction based on the analysis of the video content; and
   executing a remedial action responsive to determining that the second copyright violation prediction satisfies predefined second criteria.

5. The method of claim 1, wherein the remedial action triggers at least one of a take-down of content of the channel and a revocation of content-sharing permissions for an owner of the channel.

6. The method of claim 1, wherein the remedial action creates a log entry flagging the channel for subsequent manual review.

7. The method of claim 1, wherein the feature-based classifier implements a random forest model.

8. A system for identifying a channel as being a source of pirated copyrighted material, the system comprising:
   a feature-based channel classifier stored in memory and executable to:
      analyze a received set of channel features for the channel, each one of the channel features being a channel attribute determined without analyzing video or audio content of the channel; and
      output a first copyright violation prediction indicating a probability that copyright-protected material is available through the channel; and
   a remedial action initiator stored in memory and executable to initiate a remedial action when the first copyright violation prediction satisfies predefined criteria, the feature-based channel classifier being a machine learning model trained on a training dataset including channel features and historical copyright piracy data for each of multiple channels, the historical copyright piracy data for each channel of the multiple channels indicating whether the channel is preidentified as a source of pirated copyright material.

9. The system of claim 8, wherein the channel features include one or more features from a group comprising:
   a ratio between a number of subscribers to the channel and a number of active videos available on the channel;
   a geographical source associated with the channel;
   an age of the channel;
   channel banner;
   historical changes in channel viewership; and
   metadata indicating ownership claims to content of the channel.

10. The system of claim 8, wherein the channel features include channel metadata including at least one of a channel description and a title.

11. The system of claim 8, further comprising:
a content-based classifier stored in memory and executable to:
analyzing video content of the channel responsive to a determination that the copyright violation prediction output by the feature-based classifier exceeds a first predefined threshold but does not exceed a second predefined threshold, the video content including at least one of image data and audio data; and
render a second copyright violation prediction based on the analysis of the video content, wherein the remedial action initiator is further executable to initiate the remedial action responsive to determining that the second copyright violation prediction satisfies predefined second criteria.

12. The system of claim 8, wherein the remedial action triggers at least one of a take-down of content of the channel and a revocation of content-sharing permissions for an owner of the channel.

13. The system of claim 8, wherein the remedial action includes creating a log entry flagging the channel for subsequent manual review.

14. The system of claim 8, wherein the feature-based classifier implements a random forest model.

15. One or more memory devices encoding instructions for executing a computer process comprising:
inputting a set of channel features to a feature-based classifier trained based on a training dataset including channel features and historical copyright piracy data for each of multiple channels, each one of the channel features being a channel attribute determined without analyzing video or audio content of the channel, the historical copyright piracy data included in the training dataset for the feature-based classifier includes a binary indicator for each of the multiple channels, the binary indicator indicating whether the associated channel is preidentified as a source of pirated copyright material;
receiving an output from the feature-based classifier, the output including a first copyright violation prediction indicating a probability that copyright-protected material is available through the channel; and
executing a remedial action when the first copyright violation prediction satisfies predefined criteria.

16. The one or more memory devices of claim 15, wherein the channel features include one or more features from a group comprising:
a ratio between a number of subscribers to the channel and a number of active videos available on the channel;
a geographical source associated with the channel;
an age of the channel;
channel banner;
historical changes in channel viewership; and
metadata indicating ownership claims to content of the channel.

17. The one or more memory devices of claim 15, wherein the computer process further comprises:
determining that the copyright violation prediction output by the feature-based classifier exceeds a first predefined threshold but does not exceed a second predefined threshold;
analyzing video content of the channel responsive to the determination, the video content including at least one of image data and audio data;
rendering a second copyright violation prediction based on the analysis of the video content; and
executing a remedial action responsive to determining that the second copyright violation prediction satisfies predefined second criteria.

* * * * *